Aug. 4, 1936.  R. S. KIBLER  2,050,185
CONTINUOUSLY VARIABLE TRANSMISSION
Filed June 4, 1934  4 Sheets—Sheet 4
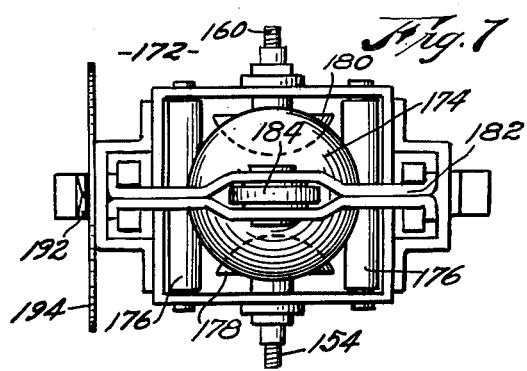
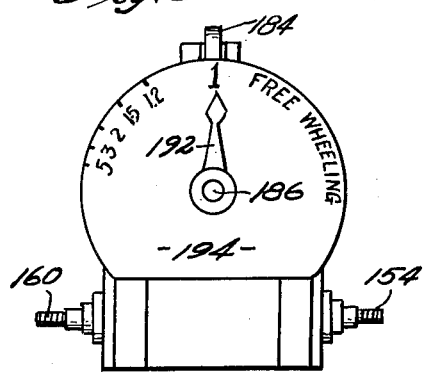
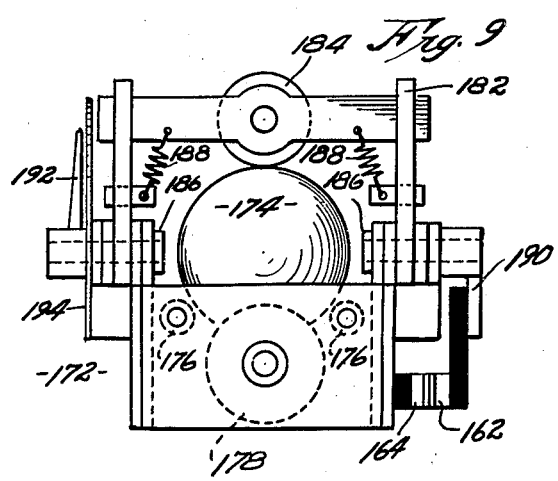
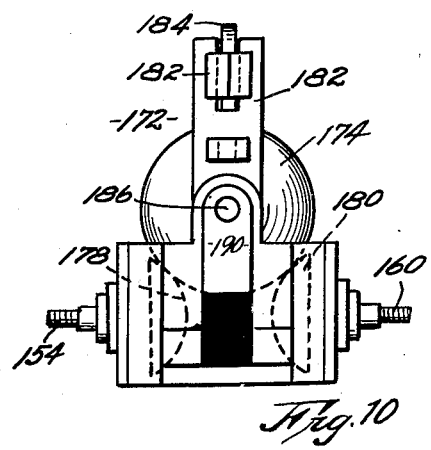
INVENTOR,
Ray S. Kibler:
Harvey F. Hamilton,
ATTORNEYS.

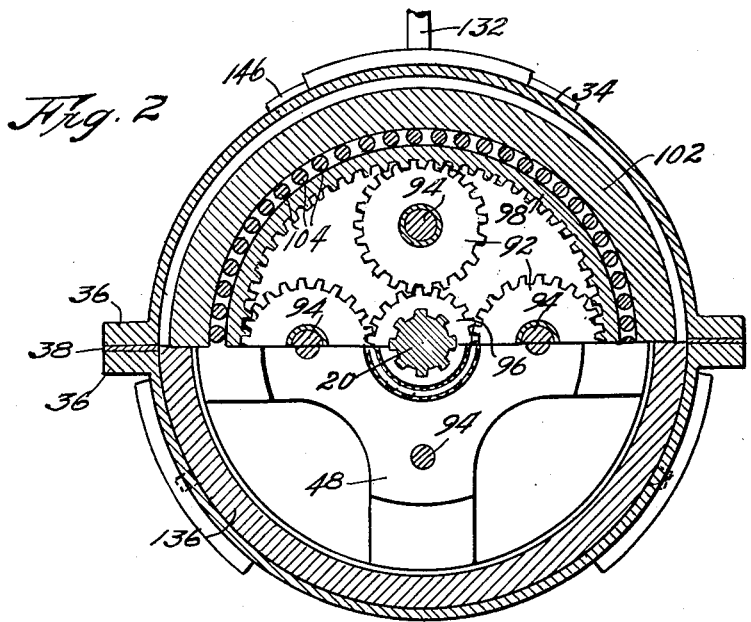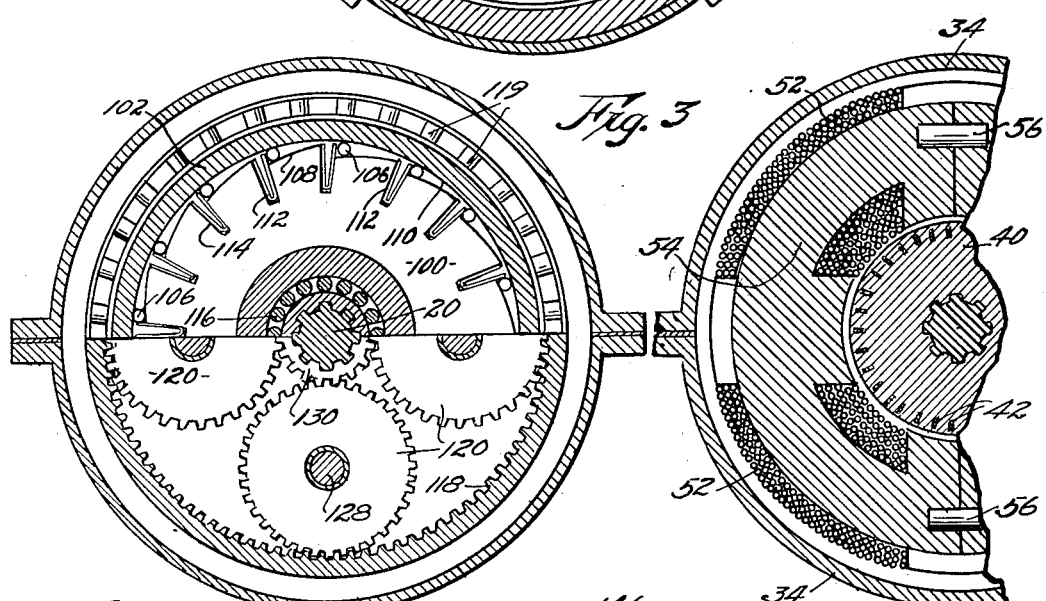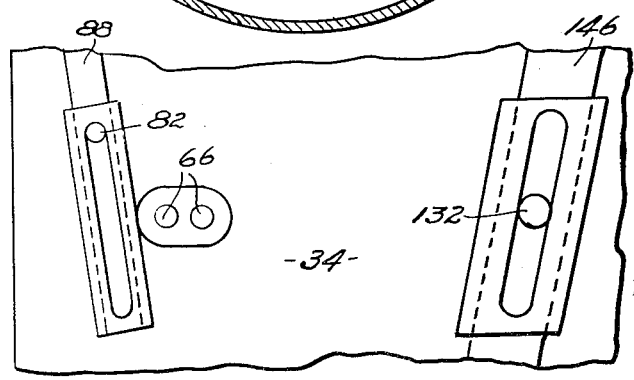

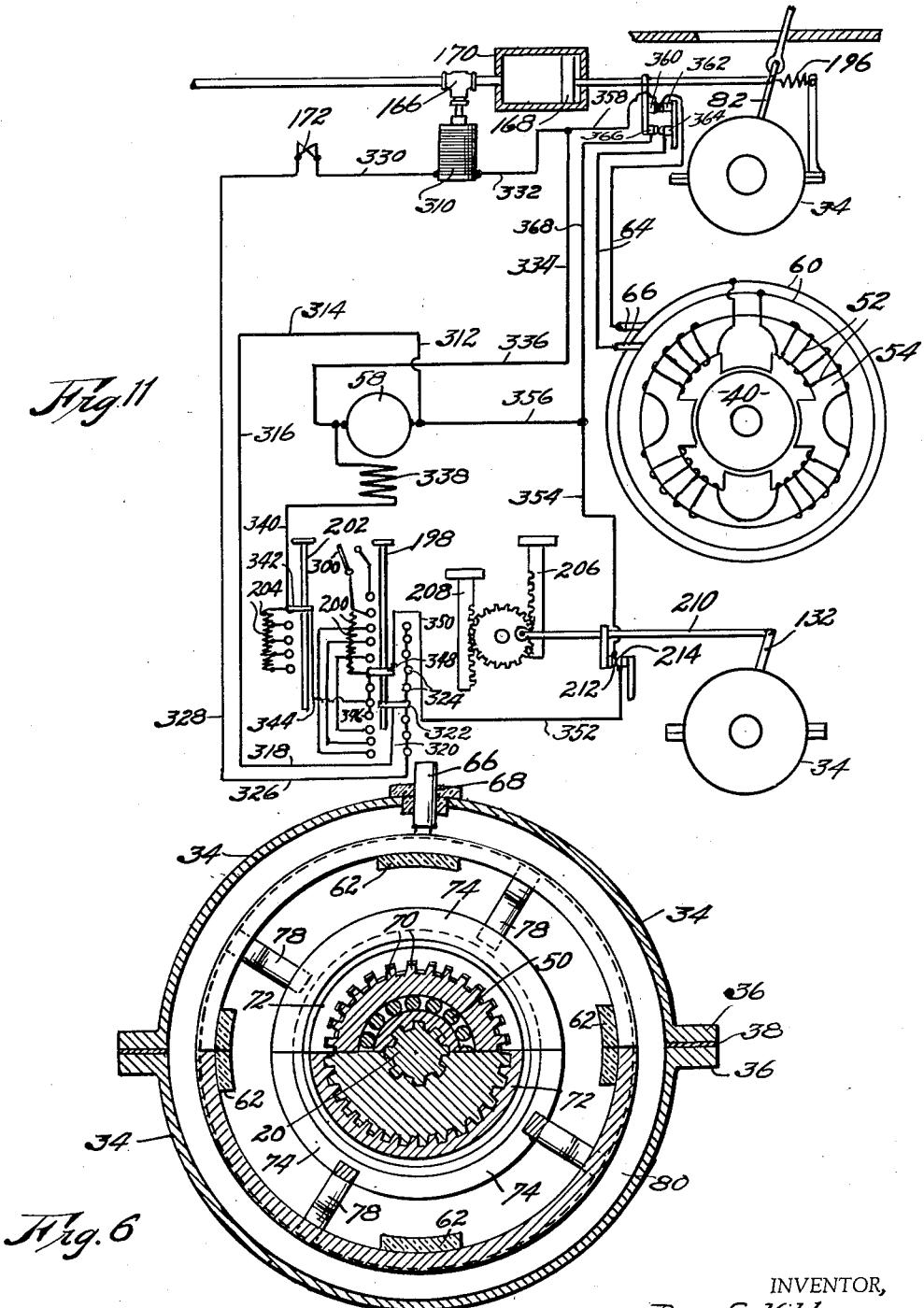

Patented Aug. 4, 1936

2,050,185

UNITED STATES PATENT OFFICE 2,050,185

CONTINUOUSLY VARIABLE TRANSMISSION

Ray S. Kibler, St. Louis, Mo.

Application June 4, 1934, Serial No. 728,924

10 Claims. (Cl. 172—239)

This invention relates to transmission mechanism adapted particularly for use in automotive vehicles where power is transmitted from an internal combustion engine to the wheels of the vehicle through the medium of a differential or other suitable and necessary intervening apparatus, and the primary object of the invention is to provide a continuously variable transmission that embodies coupling means between the driving and driven shafts, which serves to selectively establish a variable connection in an unique manner so as to vary the relative speeds of the aforesaid shafts without the employment of manually controlled shifting mechanism such as is commonly utilized.

One of the important objects of the instant invention is to provide a transmission of the automatic continuously variable type, wherein is embodied coupling means between the driving and driven shafts having the property of establishing a torque interchange within the coupling means so that as the speed of the driving shaft is varied, power imparted to the driven shaft will likewise be varied in a proportional degree.

Another aim of this invention is the provision of such a transmission, having as a part of the coupling mechanism, a rotor and a field member, and means for introducing an electrical current to one of said members to produce a magnetic circuit whereby a motor action is set up resulting in adjustment of the relative angular velocities which is proportional to the strength of the magnetic flux established by the input voltage.

Another object of the invention is the contemplation of a transmission having a driving and a driven shaft, the former having a rotor affixed thereto, while the latter is suitably geared to a field member that is in juxtaposition to the rotor and is adapted to have an electrical current applied thereto for the purpose of establishing a magnetic connection, said current being variable by suitable means either through automatic devices or apparatus under the control of the operator whereby the connection between the parts of the transmission will be varied to suit power and speed conditions.

A yet further aim of this invention is the provision in a transmission of the aforementioned type of means for controlling the electrical input to the transmission as the internal combustion engine actuating the drive shaft is accelerated and also means for securely locking together all of the parts of the transmission at a predetermined time.

With the aforementioned broad objects in view, and with minor objects remaining to be set forth in the specification, the invention will be set forth by reference to the accompanying drawings, wherein:

Fig. 2 is a vertical, cross section through the transmission taken along line II—II of Fig. 1 and looking in the direction of the arrow.

Fig. 3 is a similar cross sectional view taken along line III—III of Fig. 1 and looking in the direction of the arrow.

Fig. 4 is a fragmentary, cross sectional view taken on line IV—IV of Fig. 1.

Fig. 5 is a top plan view of a fragment of the transmission casing, showing the controls.

Fig. 6 is a cross sectional view taken along line VI—VI of Fig. 1.

Fig. 7 is a top plan view of the ratio switch.

Fig. 8 is an end elevation of the same.

Fig. 9 is a side elevation of the said switch.

Fig. 10 is an elevation of the other end of the ratio switch, and

Fig. 11 is a diagrammatical view illustrating the electrical circuit employed in one form of the embodiment of the invention.

Figure 1:
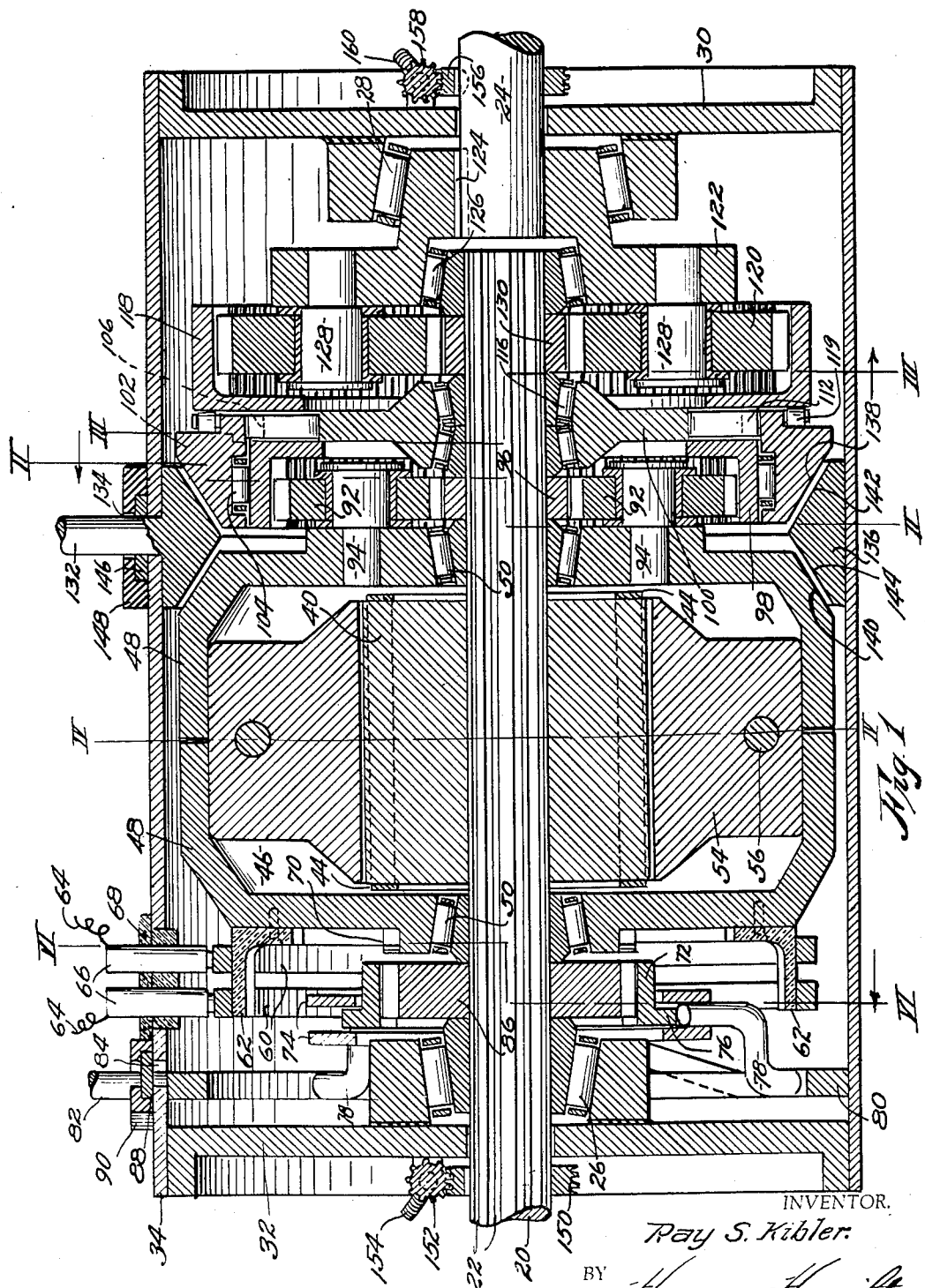
Figure 1 is a vertical, central, longitudinal, sectional view through a transmission embodying one form of this invention.

While the transmission mechanism about to be described is explained as being used as a part of an automotive vehicle for imparting power from the internal combustion engine thereof to the driven wheels, it is understood that the invention per se lies in the transmission mechanism and its combination with parts of the automotive vehicle with which it operates in order to produce the results contemplated.

The driving shaft 20, therefore, is of the usual character in that it is rotated about its axis by any suitable internal combustion engine or other source of power not here shown. This driving shaft 20 has a series of longitudinal grooves 22 formed in the annular periphery thereof, whereby the parts associated with shaft 20 might be splined or keyed thereto. A driven shaft 24 extends from the transmission mechanism proper to power-receiving wheels or other unit and two main roller bearings 26 and 28 respectively support driving shaft 20 and driven shaft 24. These bearings are formed by ends 30 and 32 which form a part of the transmission housing 34 and the housing is split longitudinally as shown in Figs. 2 and 3 so that an upper and a lower arcuate portion of housing 34 may be removably secured together through the medium of their outturned flanges 36, between which is positioned a suitable gasket 38.

Shafts 20 and 24 may be in axial alignment as shown in Fig. 1 and the means for coupling said shafts includes both a train of gears and a means for selectively establishing a variable connection between two relatively movable parts of the coupling means. On driving shaft 20 is mounted a rigid member or rotor 40, which has as a component part thereof, a squirrel cage winding comprising a plurality of embedded longitudinal bars 42 joined at the ends thereof by rings 44.

A field piece 46 electrically coacts with rotor 40 and comprises joined frame members 48 that are mounted upon bearings 50 so that field piece 46 might rotate on the axis of driving shaft 20 independently of the rotation of said shaft 20.

As illustrated in Fig. 4, this field piece 46 is provided with coils 52 wound on yoke 54 to present an even number of magnetic circuits, each of which acts independently of the other. The even number of units are held together by dowels 56 and electrical energy is carried to coils 52 from a suitable source of power, which, in this instance, may be a direct current generator 58, driven through a suitable connection by shaft 24. To impart this electrical energy to field piece 46 as the same is rotated, there is provided a plurality of collector rings 60 that are mounted upon frame 48 through the use of suitable brackets 62. Collector rings 60 receive electrical energy from generator 58 through wires 64 which join said generator and the brushes 66 that are carried by the transmission casing 34 and insulated therefrom, as shown at 68.

There should be some means in the transmission for locking together the movable parts thereof so that a direct drive connection might be established from shaft 20 through to shaft 24 and one means for so accomplishing this result is the electrical unit being described, frame 48 has a series of teeth 70 formed on one end thereof, which may be engaged by the internally toothed tie member 72, held for reciprocating, longitudinal movement along a path of travel parallel to the axis of shaft 20 by a pair of rings 74 which are positioned on each side of an annular, outturned flange 76 formed on member 72. These rings 74 are mounted and held in position by spokes 78 that extend radially outwardly from between rings 74 to an operating ring 80 adjacent the annular side of housing 34.

A lever 82 joins ring 80 and extends exteriorly of housing 34 through an inclined slot 84 formed in housing 34 and the angle of inclination of slot 84 is such that when lever 82 is moved from one end thereof (position shown in Fig. 5), to the other end thereof, rings 74 will move tie member 72 so that its teeth will mesh with teeth 70. To complete the desired joining, tie member 72 is in mesh with a gear 86 which is rigidly mounted upon shaft 20 for rotation therewith.

Lever 82 is automatically movable in a number of instances, as will hereinafter be fully set down. It is desirable to seal or close slot 84 and to accomplish this end, a plate 88 is mounted upon lever 82 for movement therewith and this plate is slidably held against the outer face of housing 34 by member 90.

The train of gears which joins field piece 46 to driven shaft 24 may consist of a number of sets of planetary gears and a satisfactory embodiment of this feature of the invention is illustrated in the drawings. There are a number of planetary gears 92 rotatably mounted upon frame 48 through the medium of stub shafts 94 that are positioned in an annular path concentric with the axis of shaft 20, upon which is splined pinion 96 that is in mesh with all of said planetary gears 92. An internal gear 98 is in mesh with all of gears 92 and circumscribes the same. This internal gear 98 is affixed to wheel 100 which forms a part of the over-running clutch or ratchet means which limits the rotation of wheel 100 to one direction when the hereinafter mentioned control devices are set in certain positions. The coacting member of this over-running clutch or ratchet mechanism, of which wheel 100 is a part, is the friction ring 102 that is rotatably mounted upon the outer annular face of internal gear 98 by roller bearings 104.

Relative rotative movement between wheel 100 and friction ring 102 is limited to one direction by the floating rollers 106 which ride upon inclined faces 108 between the inner annular face 110 of ring 102 and which are urged toward an interlocking position by the small, U-shaped springs 112, one of which bears against each roller respectively and which are respectively held in operative position by notches 114 formed inwardly from the outer edge of wheel 100. This wheel 100 is mounted for free rotation upon shaft 20 by a suitable bearing 116.

Another internal gear 118 is mounted upon the other side of wheel 100 and is in mesh with and circumscribes a series of planetary gears 120, each of which is mounted upon bracket 122 keyed as at 124 directly to driven shaft 24. Roller bearings 119 should be interposed between ring 102 and gear 118 to co-operate with rollers 104 in operably carrying said ring 102. Bracket 122 has a bearing 126 upon shaft 20 and stub shafts 128 carried by bracket 122 rotatably support planetary gears 120. A pinion 130, rigid to shaft 20, is in mesh with all of planetary gears 120.

It is notable that the planetary gears 92 and 120 are free to bodily rotate about the axis of the shaft 20. No part of the sets of planetary gears is secured to a rigid member as is the case in most transmissions and the bodily movement of the planetary gears about the axis of shaft 20 by some power forms an important feature.

A control lever 132 extends through an inclined slot 134 formed in the wall of housing 34 to join friction ring 136 which is positioned between ring 102 and its inclined face 138 and the inclined face 140 of frame 48. This positioning is such that upon reciprocation of ring 136 its inclined face 142 will engage face 138 at one end of its path of travel and its other inclined face 144 will engage inclined face 140 at the other end of its path of travel.

This reciprocating movement is imparted to ring 136 when lever 132 is moved through slot 134. It is this lever which sets the transmission in either neutral, reverse, or forward positions. Slot 134 is sealed in much the same manner as slot 84 in that a plate 146 carried by lever 132 closes slot 134 at all times. Obviously, the lengths of these plates 88 and 146 are sufficient to accomplish the desired end. Plate 146 is mounted in position by guide 148. A throttle 198 is mounted to move through a part of its path of travel when contacts 162 and 164 of a ratio switch 172 are closed. During this movement solenoid 310 of valve 166 is energized, thereby to maintain the joining members 40 and 46 in an operative condition through the following circuit: Generator 58, wire 312, wire 314, wire 316, wire 318, wire 320 to contact point 322 which slides over contact area 324, wire 326, wire 328 to ratio switch 172, wire 330 to solenoid 310, wire 332, wire 334 and wire 336 to the other side of generator 58.

The field circuit for generator 58 wherein is employed the resistance members 200 and 204 is as follows: Generator 58, its field winding 338, wire 340 to variable resister 204, contact 342, wire 344, contact 346 to contact 348, either directly as shown or through variable resistance 200 and/or through switch 300, wire 350, wire 352, contact 214, contact 212, wire 354, wire 356 to the other side of generator 58. When selector lever 132 is moved by rod 210 to place the lever in a reverse or neutral position, the field circuit just traced is opened by the parting of contacts 212 and 214. This circuit is also opened when throttle control 198 is in a released condition and at the beginning of its path of travel, at which time switch 300 is open.

The field circuit for field member 46 receives energy from generator 58 and this circuit is as follows: From one side of generator 58, wire 336, wire 334, wire 358, closed contacts 360 and 362, that are in the closed position when lever 82 has moved the locking member 72 to the unlocked position, one of wires 64 to one brush 66, to one collector ring 60, coils 52, thence to the other collector ring 60, other brush 66 and its associated wire 64 to contact points 364 and 366, wires 368 and 356 to the other side of generator 58.

A hereinafter described ratio switch which controls the mechanism including member 76 to lock and unlock the parts of the transmission must be actuated by devices driven by both the driving shaft 20 and the driven shaft 24. There is provided, therefore, a pinion 150 on shaft 20 that is in mesh with a gear 152 at the end of a flexible shaft 154 which it drives. The driven shaft has a similar pinion 156 carried thereby which drives gear 158 on the end of flexible shaft 160.

The ratio switch illustrated in Figs. 7 to 10 inclusive is likewise an indicator, but its mechanical function is that of making and breaking suitable contact points 162 and 164 as the speeds of shaft 20 and shaft 24 approach the point of synchronism and depart from said point respectively. When a ratio of one to one is established in the transmission, contact points 162 and 164 will be together to complete a circuit to a solenoid-operated valve 166 which will open and cause the suction from the intake manifold of the engine to act upon piston 168 in cylinder 170 in such a manner as to cause lever 82 to move connector 72 to a position where it engages both teeth 70 on frame 48 and the teeth of gear 86.

The ratio switch 172 is provided with a floating sphere 174 mounted between rollers 176 and frictionally carried upon spherical faced disks 178 and 180 that are rotated by flexible shafts 154 and 160 respectively. A yoke 182 carries wheel 184 so that its annular periphery is in engagement with the surface of sphere 174 and said yoke 182 is pivotally supported upon axially aligned stub shafts 186 so that as the relative speeds of disks 178 and 180 vary, wheel 184 will be caused to ride over sphere 174 toward one or the other of said disks. This movement is in a path concentric to the axis of stub shaft 186 and the position of the parts of ratio switch 172 illustrate a condition where the locking mechanism is in the operative position. Suitable springs 188 draw wheel 184 toward sphere 174 and yoke 182 and switch arm 190 are attached to one stub shaft 186, while the other stub shaft carries pointer 192 across the face of the indicia-bearing plate 194. Contact points 162 and 164 are suitably insulated from the other parts of ratio switch 172 as illustrated in Figs. 9 and 10 and after these said contact points are moved apart, valve 166 will be closed by any suitable retriever to remove the suction action from within cylinder 170 and retrieving spring 196 will move the parts to, and maintain the same in, the condition illustrated in Fig. 1.

Figs. 7 to 10 inclusive illustrate the condition of the parts of ratio switch 172 when disks 178 and 180 are rotating in the same direction and at the same speed. Sphere 174 will rotate about an axis parallel to the axis of disks 178 and 180 and through the center of sphere 174. Yoke 182 and wheel 184 pivot on shafts 186 and swing so as to be at right angles to the axis around which sphere 174 is rotating. As disks 178 or disk 180 exceeds in speed the other, the axis around which sphere 174 revolves shifts to an inclined position. The position assumed by the axis of sphere 174 is such that the perpendicular distance from said axis to each of spherical disks 178 and 180 is proportional to the speed at which each disk is rotating. Yoke 182 and wheel 184 swing to a position at right angles to the axis of sphere 174.

In the electrical type of variable transmission, means for establishing a connection between the driving shaft 20 and rotor 40 and field member 46 and the related trains of gears which join the same to driven shaft 24, is the electrical current that is introduced to the field member by way of coils 52 whereby to produce a torque interchange between the rotor 40 and field member 46. This electrical input is varied as the throttle of the internal combustion engine is opened and the accelerator pedal 198, under the control of the operator, has associated therewith a number of resistance members 200 for varying the flow of energy in the circuit which supplies the energy to coils 52.

The varying of the flow of energy in the said circuit impresses a direct current voltage of suitable intensity on the field of what is actually a dynamo, and a magnetic flux is caused to flow through each of yokes 54 of the field member, thence through a pole of the field member 46, then across the air gap between the pole and the rotor 40, thence through the rotor and across the air gap from the rotor to the adjacent pole, then through the pole to the yoke, which completes the circuit. When this magnetic circuit is established and the rotor 40 and field member 46 are rotating at different speeds, the squirrel cage winding in the form of bars 42 and rings 44 cuts the magnetic flux so as to produce a voltage between rings 44. This voltage generated in rotor 40 causes a current to circulate through the bars 42 and through the rings 44 at each end of rotor 40 in such a fashion as to produce magnetic poles in the rotor.

The reaction between these poles and the poles established by the direct current winding on the field piece 46 causes a motor action to be set up in the part of the coupling mechanism that results in an adjustment of the relative speeds of rotor 40 and its shaft 20 and field piece 46 that is proportional to the lines of magnetic flux established by the coils 52 and voltage on same in the field piece 46. It is this varying speed that is transmitted to the train or trains of gears from field piece 46 and thence to driven shaft 24.

After the accelerator 198 has been operated to a point where the engine throttle is substantially wide open, and member 72 has moved to lock together members 40 and 46, and no increase in speed is possible, with the transmission so locked together, control 198 is further depressed so that the circuit to solenoid 310 is opened to permit the direct drive locking mechanism including member 72 to be returned to the unlocked position. Reference to Fig. 11 will readily teach how this circuit, traced hereinbefore will be opened. Contact point 322 is moved below the lowermost contact area and out of contact therewith when throttle 198 is depressed to that extent. Inserting of additional resistance in the field circuit of generator 58 is accomplished by the aforementioned further depressing of control 198 to produce even further increased speeds until the transmission ratio producing maximum speed with completely opened throttle is obtained. The offset relation of contact points 322 and 348 insures that the latter will engage the faces of contact area 346 below the one numbered after the former has left area 324. Quick acceleration is accomplished only through the use of auxiliary accelerator 202, which inserts resistances 204 in the field circuit of generator 58 independently of the position of control 198.

Two sets of contacts from resistor 200 are provided for the purpose of first allowing the movement of pedal 198 to progressively cut out resistance members 200 as it approaches the position where no increase in speed is possible with a transmission ratio of one to one with a wide open throttle. After such condition exists further increased speeds are obtained by progressively inserting resistance members 200 in the field circuit of the direct current generator until the transmission ratio producing maximum speed with wide open throttle is obtained.

Movement of selector lever 132 so that the aforementioned adjacent friction surfaces 138 and 142 and 140 and 144 might be brought together is accomplished through the employment of an ordinary manually operable reverse pedal 206 and forward pedal 208, diagrammatically illustrated in Fig. 11. Operating connecting rod 210 serves to open and close switch points 212 and 214 as lever 132 is moved to and from the forward position because it is desired to render the electrical circuit entirely inoperative when the ring 136 is in either the neutral or reverse position.

Operation

In describing the operation of the transmission, the use of the word "clockwise" will mean that the member under consideration is rotating in the same direction as driving shaft 20, which, of course, rotates with the shaft of the aforementioned prime mover or engine. "Counter-clockwise" will mean rotation in an opposite direction. When the said engine is started and the automotive vehicle is stationary, selector ring 136 is in the neutral position. When such is the case, all parts attached to the driving shaft 20 rotate in a clockwise direction and driven shaft 24 is not rotated. Internal gears 98 and 118, together with wheel 100, to which they are attached, rotate in a counter-clockwise direction and field member 46, which carries planetary gears 92, is caused to rotate in a clockwise direction. There is no excitation applied to the field piece 46 through its coils 52 because the generator 58 that is driven by shaft 20 is not generating a voltage. The field circuit of the generator is open because contacts 212 and 214 controlled when the selector 132 is moved, have not been closed.

With the engine running, and it is desired to move the vehicle in the reverse direction, pedal 206 is depressed with the result that lever 132 is moved to bring ring 136 to a position where friction faces 140 of frame 48 and face 144 of ring 136 are brought together. This prevents rotation of field member 46 and internal gears 98 and 118 rotate in a counter-clockwise direction. Planetary gears 120 and driven shaft 24 to which they are attached are caused to rotate in a counter-clockwise direction. Reverse movement is halted merely by returning selector ring 136 to the neutral position illustrated in Fig. 1.

To move the vehicle forwardly, forward pedal 208 is depressed so that friction ring 136 is moved against member 102 in order that friction faces 138 and 142 might contact. This member 102 is associated with wheel 100 to assist in forming the aforementioned over-running clutch. Wheel 100 supports internal gears 98 and 118. The over-running clutch is arranged to permit clockwise rotation of wheel 100 and obviously internal gears 98 and 118 may likewise be moved in a clockwise direction. Because internal gear 98 is held against movement in a counter-clockwise direction, planetary gears 92 and 120 rotate in a clockwise direction. The driven shaft 24 is attached to planetary gears 120 through the medium of member 122 and thus driven shaft 24 rotates in a clockwise direction at the same angular velocity as said planetary gears 120.

An action in the nature of so-called "free wheeling" is had in all forward speeds of the transmission except where the direct drive is in operation. This action is had by virtue of the fact that the field circuit of the direct current generator is broken each time that accelerator 198 is permitted to attain its normal position. There is no torque interchange under such conditions and if the speed of the vehicle is greater than the engine speed, there is a tendency to rotate field member 46 at a greater speed in a clockwise direction than rotor 40 is being rotated. A switch 300 is provided to close the field circuit of the direct current generator when accelerator 198 is in its normal position. This condition results in a magnetic flux in field piece 46 at all times and eliminates the possibility of complete free wheeling action.

After the vehicle is moving forward through the connection mentioned above and the transmission ratio is approximately six to one and it is desired to increase the speed, the throttle control 198 is depressed an additional amount. This action results in supplying additional fuel to the engine to increase the speed of rotation of driving shaft 20 and the auxiliary control equipment is brought into play by the closing of the field circuit of the direct current generator through the maximum resistance in the variable resistance which is associated with the throttle control accelerator. The closing of the field circuit of the direct current generator causes a voltage to be generated which is impressed on the field of the dynamo in the transmission. The combined action of an increased throttle opening to the engine and the decreased ratio in the transmission results in an increased speed forward of the car. The resistance of the variable resistance 200 actuated by the throttle control is so regulated as to result in the lowest possible ratio of the transmission consistent with the smooth performance of the engine.

After the car has obtained sufficient forward speed to justify a ratio of one to one in the transmission, the last portion of the variable resistance is cut out by depressing member 198 so that its element 348 is on one of the interconnected series of contacts 346, as illustrated in Fig. 11. The voltage generated by the direct current generator is thereby raised to a point where the resultant field strength is ample to change the angular velocities of the rotor and field so that the difference in the same is a minimum. When this point is reached, the ratio switch will indicate a transmission ratio of slightly more than one to one. Points 162 and 164 will close, thereby completing the circuit to the solenoid-operated valve 166 to open the same which will permit the suction from the intake manifold to act on the piston 168 in such a way as to cause the direct drive mechanical locking mechanism to move from the unlocked to the locked position. This action also operates to open the two pole switch which disconnects the dynamo field from the direct current generator and when the full speed ahead or the direct drive locking mechanism is in the locked position, all parts of the transmission rotate at the same angular velocity.

When this full speed ahead is reached and no increase is possible, if a hill is encountered a transmission ratio of one to one and the throttle wide open the speed will drop owing to the torque characteristics of the engine, further depressing member 198 causes the circuit to the solenoid-operated valve to be opened, causing the direct drive locking mechanism to return to the unlocked position and inserting resistance elements 200 in the field circuit of generator 58, thereby again driving through the electrical clutch so that the engine can be speeded up, bringing about an increased ratio in the transmission so that the speed of the car can be maintained at about its speed on the level. Further increased speeds are obtained by progressively inserting additional resistance in the field circuit of generator 58 until the transmission ratio producing maximum car speed with wide open throttle is obtained.

The electrical phases of this transmission become apparent as the description and mechanical operation are understood. Each electrical unit and circuit has been set down in detail, and it is evident that the direct current which is impressed on the rotating field member causes a magnetic flux to flow as heretofore mentioned. Magnetic poles are produced in the rotor, the reaction between which and the poles established by the direct current winding on the field of the rotor causes a motor action to be set up which results in an adjustment of the relative angular velocities of the rotor and field that is proportional to the strength of the magnetomotive force established by the winding on the field.

Generator 58 supplies energy to the field circuit as throttle 198 is depressed. When throttle 198 is in the idling position, no energy passes from generator 58 to the field circuit, but when the vehicle is moving forwardly and the transmission ratio is approximately six to one and throttle 198 is depressed, the field circuit of the generator is closed through the resistance members 200 and the members are progressively cut out of the circuit until a condition is reached where no increase in speed is possible with a transmission ratio of one to one with a wide open throttle. After such condition prevails, the circuit including the generator, solenoid 310 and the field member, is opened and the direct drive mechanism is allowed to return to the unlocked position. Further depressing of the throttle inserts additional resistance in the field circuit of generator 58 until the transmission ratio producing maximum speed is obtained.

Having thus described the invention, what is claimed as new and desired to be secured by Letters Patent is:

1. In a transmission of the character described having a driving shaft and a driven shaft; the combination of means coupling said shafts comprising a member rigid with the driving shaft, a coacting member mounted for rotation about the axis of the driving shaft, and a train of gears joining the coacting member and the driven shaft to drive the latter when the former is moved by said rigid member; means including an alternating current created by the relative movement of said members for selectively establishing a variable connection between said rigid member and the coacting member to vary the relative speeds of the said shafts; means for mechanically locking together the driving and driven shafts; means, including a solenoid-operated valve for actuating the locking means; and a ratio switch operable by both the driving and driven shafts having electrical connection with the said valve for the purpose specified.

2. In a transmission of the character described having a driving shaft and a driven shaft; the combination of means coupling said shafts comprising a member rigid with the driving shaft, a coacting member rotatably mounted on the driving shaft, and a train of gears joining the coacting member and the driven shaft to drive the latter when the former is moved by said rigid member; means for establishing a torque interchange, connection between said driving shaft member and the coacting member; and structure operable by the last mentioned means when the driving shaft member and coacting member attain a certain speed ratio for rigidly securing together the said driving shaft and the said coacting member.

3. In a transmission of the character described having a driving shaft and a driven shaft; the combination of means coupling said shafts comprising a member rigid with the driving shaft, a coacting member rotatably mounted on the driving shaft, and a train of gears joining the coacting member and the driven shaft to drive the latter when the former is moved by said rigid member; means driven by the said driving shaft and effected by the change of speed thereof for establishing a connecting force between said driving shaft member and the coacting member; and structure operable by the last mentioned means for rigidly securing together the said driving shaft and the said coacting member when the rotative speeds of said driving shaft and said driven shaft attain a predetermined relation.

4. In a transmission of the character described having a driving shaft and a driven shaft; the combination of means coupling said shafts comprising a member rigid with and rotatable by the driving shaft, a coacting member rotatably mounted on the driving shaft and independently movable about the axis thereof, and a train of gears joining the coacting member and the driven shaft to drive the latter when the former is moved by said driving shaft and said member rigid therewith comprising planetary gears on the coacting member and an internal gear in mesh therewith on the driven shaft; means for establishing a variable connection between said driving shaft member and the coacting member; a reciprocable selector member engageable with the said coacting member at one end of its path of travel to render the same ineffective in transmitting power from the driving shaft to the driven shaft; and a pinion on said driving shaft in mesh with certain of the gears of said gear train whereby to reverse the direction of rotation of the said driven shaft when said movable selector is in engagement with the coacting member.

5. In a transmission of the character described having a driving shaft and a driven shaft; the combination of means coupling said shafts comprising a member rigid with and rotatable by the driving shaft, a coacting member rotatably mounted on the driving shaft and independently movable about the axis thereof, and a train of gears joining the coacting member and the driven shaft to drive the latter when the former is moved by said driving shaft and the member rigid therewith; means for establishing a variable connection between said driving shaft member and the coacting member; and a reciprocable member movable to engage said coacting member at one end of its path of travel and to engage one of the gears of said gear train at the other end of its path of travel.

6. In a transmission of the character described having a driving shaft and a driven shaft; the combination of means coupling said shafts comprising a member rigid with and rotatable by the driving shaft, a coacting member rotatably mounted on the driving shaft and independently movable about the axis thereof, and a train of gears joining the coacting member and the driven shaft to drive the latter when the former is moved by said driving shaft and member rigid therewith; and means for establishing a variable connection between said driving shaft member and the coacting member, said train of gears including a series of planetary gears mounted on said coacting member, an internal gear circumscribing and in mesh with all of said planetary gears, a pinion splined on said driving shaft and in mesh with said planetary gears on the coacting member, a wheel mounted for independent rotation about the axes of said shaft, an internal gear carried by said wheel, and a series of planetary gears carried by the said driven shaft in mesh with said last mentioned internal gear whereby variations in the speed of the driven shaft is obtained as the aforesaid connection is altered relative to the speed of rotation of said driving shaft.

7. In a transmission of the character described having a driving shaft and a driven shaft; the combination of means coupling said shafts comprising a member rigid with and rotatable by the driving shaft, a coacting member rotatably mounted on the driving shaft and independently movable about the axis thereof, and a train of gears joining the coacting member and the driven shaft to drive the latter when the former is moved by said driving shaft and member rigid therewith; means for establishing a variable connection between said driving shaft member and the coacting member, said train of gears including a series of planetary gears mounted on said coacting member, an internal gear circumscribing and in mesh with all of said planetary gears, a pinion splined on said driving shaft and in mesh with said planetary gears on the coacting member, a series of planetary gears mounted in a circumscribing path on said driven shaft, an internal gear in mesh with and circumscribing said last mentioned planetary gears, a second pinion splined on said driving shaft in mesh with the last mentioned planetary gears, said internal gears being rigidly connected to rotate together; and means for selectively precluding rotation of said internal gears in one direction about the axes of said driving shaft and driven shaft whereby variations in the speed of and change in direction of rotation of the driven shaft is obtained as the aforesaid connecting force is altered and as the selective means for precluding rotation of the internal gears in one direction is moved to the effective position respectively.

8. In a transmission having a driving shaft and a driven shaft, coupling means establishing connection between said shafts comprising a rotor mounted on the driving shaft, a field member mounted for rotation on the axis of the driving shaft, and a train of gears joining the field member and the driven shaft; means for introducing electrical current to said field member as the same is rotated whereby to produce a torque interchange between the rotor and the field member; a locking device to secure together the coupling means to produce a direct driving connection between the driving shaft and the driven shaft; means common to both the driving and the driven shafts for controlling the flow of electrical energy to the field; and means operable by the said controlling means for actuating the said locking device when the driving and the driven shafts attain a certain speed ratio.

9. In a transmission for automotive vehicles having a driving shaft and a driven shaft, a coupling means establishing connection between said shafts comprising a rotor mounted on the driving shaft, a field member mounted for rotation on the axis of the driving shaft and means for interconnecting the field member and the driven shaft; means for locking together the rotating parts of the transmission; means including an electrical circuit and source of electrical energy for introducing electrical energy to the field member as the said member and said rotor are rotated whereby to produce a torque interchange between the two; means driven by both the driving shaft and the driven shaft for actuating the said locking device as the shafts rotate at certain relative speeds; and a series of electrical resistance members selectively positionable in said circuit for varying the flow of electrical energy into the said circuit to attain said certain relative speeds.

10. In a transmission of the character described having a driving shaft and a driven shaft, coupling means for said shafts comprising a member mounted for rotation about the driving shaft, a plurality of planetary gears carried by said member, a pinion rigid with the driving shaft and meshing with the planetary gears, an internal gear circumscribing and in mesh with the said planetary gears, a wheel member mounted for rotation about the axis of the driving shaft independently of the rotation of said shaft and attached to said internal gear, a second internal gear attached to said wheel member, a second pinion attached to the said driving shaft, a plurality of planetary gears carried by the driven shaft and in mesh with both the second pinion and the second internal gear, a movable selector under the control of the operator and engageable with said first mentioned member to retard the rotation of the same about the driving shaft and engageable with the said wheel member to retard the rotation of the same, means for locking together the coupling means between the shafts, and means for operating said movable selector and said locking means.

RAY S. KIBLER.